(12) United States Patent
Lohan et al.

(10) Patent No.: US 12,314,890 B2
(45) Date of Patent: May 27, 2025

(54) SYSTEMS FOR DETERMINING PURCHASE FULFILLMENT OPTIONS

(71) Applicant: AMAZON TECHNOLOGIES, INC., Seattle, WA (US)

(72) Inventors: Ryan John Lohan, Seattle, WA (US); Beth Anne Porter, Seattle, WA (US); Kristiana Helmick Ebert, Seattle, WA (US); Felipe Gustavo De Almeida, Redmond, WA (US); Andrew John Van Zeeland, Bellevue, WA (US); Peter Larsen, Seattle, WA (US); Kimberly Anne Butin, Denver, CO (US); Trushna Dilip Khivasara, Seattle, WA (US); Nicole Netland, Mahtomedi, MN (US); Kadir Rathnavelu, Seattle, WA (US); Bilal Nasir Shaikh, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 391 days.

(21) Appl. No.: 17/457,527

(22) Filed: Dec. 3, 2021

(65) Prior Publication Data

US 2023/0177451 A1 Jun. 8, 2023

(51) Int. Cl.
*G06Q 30/00* (2023.01)
*G06Q 10/0834* (2023.01)
*G06Q 20/12* (2012.01)

(52) U.S. Cl.
CPC ......... *G06Q 10/0834* (2013.01); *G06Q 20/12* (2013.01)

(58) Field of Classification Search
CPC ............................. G06Q 10/0834; G06Q 20/12
See application file for complete search history.

(56) References Cited

U.S. PATENT DOCUMENTS 6,456,892 B1   9/2002   Dara-Abrams et al.
8,204,799 B1   6/2012   Murray et al.
(Continued)

FOREIGN PATENT DOCUMENTS

EP    3719726 A1    10/2020

OTHER PUBLICATIONS

Berlea, Alexandru, "Patent Cooperation Treaty International Search Report and Written Opinion dated Mar. 16, 2023", Patent Cooperation Treaty Application No. PCT/US22/80634, Patent Cooperation Treaty, Mar. 16, 2023.

(Continued)

*Primary Examiner* — Robert M Pond
(74) *Attorney, Agent, or Firm* — Lindauer Law, PLLC

(57) ABSTRACT

When a user accesses a seller webpage for an item for which expedited shipping is available, data regarding this access is provided to a separate fulfillment service that is able to deliver the item. A control on the webpage, that may be provided to the seller by the fulfillment service, presents an initial estimated delivery time based on the network address of the user's device and a known location of the item. The user may provide input to the control to access a user account, and a location for the user account may be used to update the estimated delivery time. If the item is purchased, the fulfillment service may determine payment information for the user account and process payment and delivery of the item. If an additional item not fulfilled by the fulfillment service is also purchased, data for this purchase is provided to the seller website for processing.

20 Claims, 7 Drawing Sheets

(56) References Cited

U.S. PATENT DOCUMENTS

| | | | |
|---|---|---|---|
| 9,047,607 B1 | 6/2015 | Curial et al. | |
| 9,189,768 B2 * | 11/2015 | Plaster | G06Q 30/06 |
| 9,761,061 B1 * | 9/2017 | Bussell | G07B 17/00024 |
| 10,270,878 B1 | 4/2019 | Uppal et al. | |
| 10,489,841 B1 * | 11/2019 | Ogborn | G06Q 30/0629 |
| 10,593,173 B2 | 3/2020 | Roth et al. | |
| 10,789,566 B1 * | 9/2020 | Masterman | G06Q 10/083 |
| 2008/0222003 A1 * | 9/2008 | Adstedt | G06Q 30/0631 |
| | | | 705/26.7 |
| 2008/0301009 A1 * | 12/2008 | Plaster | G06Q 10/087 |
| | | | 705/28 |
| 2012/0203614 A1 | 8/2012 | Chen et al. | |
| 2017/0118025 A1 | 4/2017 | Shastri et al. | |
| 2017/0278062 A1 * | 9/2017 | Mueller | G06Q 30/0631 |
| 2020/0090119 A1 | 3/2020 | Shiely et al. | |
| 2020/0151659 A1 | 5/2020 | Gregory et al. | |
| 2020/0160428 A1 | 5/2020 | Calvo et al. | |
| 2021/0110341 A1 | 4/2021 | Rehn et al. | |
| 2022/0394468 A1 | 12/2022 | Avetisov et al. | |

OTHER PUBLICATIONS

Garg, Yogesh C., "Non-final Office Action dated Jan. 24, 2024", U.S. Appl. No. 17/649,985, The United States Patent and Trademark Office, Jan. 24, 2024.

"Shelterzoom Corp Submits United States Patent Application for Offer Management and Transaction Management System", Global IP News. Business and Commerce Patent News, Sep. 30, 2021, 2 pgs.

Garg, Yogesh C., "Notice of Allowance dated Month DD, 20YY", U.S. Appl. No. 17/649,985, The United States Patent and Trademark Office, Apr. 10, 2024.

* cited by examiner

SYSTEMS FOR DETERMINING PURCHASE FULFILLMENT OPTIONS

BACKGROUND

Online stores and other similar entities may offer various benefits to customers, such as expedited shipping, shipping at an advantageous cost, and so forth. These benefits are typically possible due to possession by the online store of large amounts of data that indicates customer locations, the locations of stored items, the locations and capabilities of shipping providers, and so forth. Sellers of items that lack this information are normally unable to offer similar benefits.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
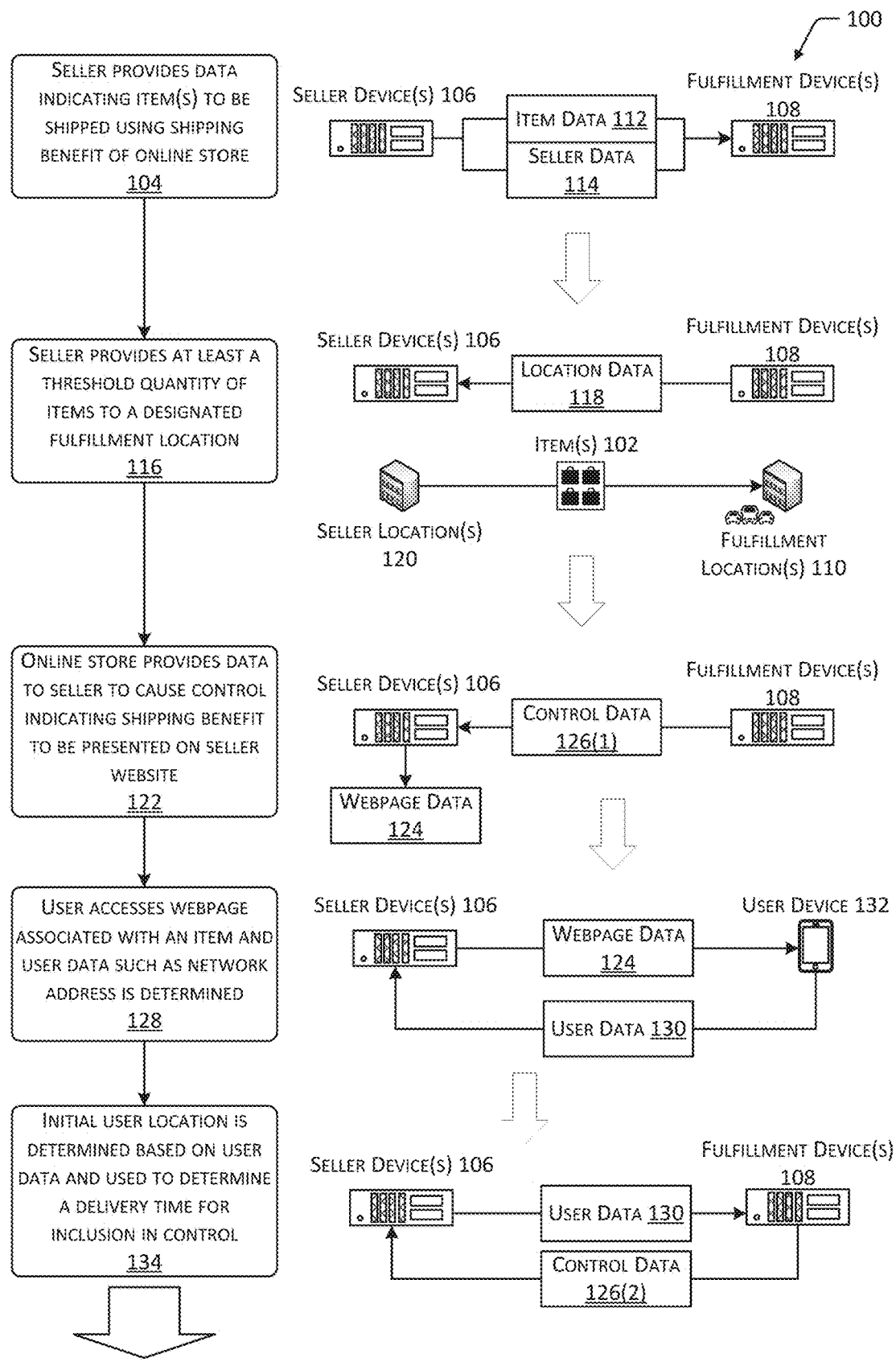
FIGS. 1A-1C illustrate an implementation of a process for using a shipping benefit associated with an online store to transport items to a user of a website associated with a seller.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Numerous sellers may offer items for purchase, lease, rental, and so forth using a website associated with the seller. For example, a user accessing the website may provide input to various controls, such as search queries, selection of links associated with items or categories, and so forth, to navigate to particular webpages that present information regarding items. Controls on one or more of the webpages may then be used to initiate purchase transactions. For example, a control may be used to navigate to a user interface where a user may provide shipping information, such as an address and preferred type of shipping, payment information, and so forth. Purchased items may then be delivered to the location indicated by the user. The characteristics for shipping of items offered by a seller are typically limited based on the capabilities of the seller. For example, if the seller is a small business, the numbers and types of shipping options available, and the prices and delivery times associated with shipment of items, may be less advantageous than the shipping options associated with a large online store. Continuing the example, a large online store may possess significant amounts of data indicative of customer locations, locations of warehouses, distribution centers, or other locations where items are stored, locations and capabilities of shipping providers, and so forth. In such a case, a large online store may offer beneficial shipping options, such as shipment at no cost or a reduced cost, shipment within an expedited timeframe, and so forth. For example, an online store may offer a membership program for which enrolled users may provide delivery addresses, and enrolled sellers may provide items to designated warehouses or other types of fulfillment locations. Using the known addresses and locations of items, the online store may then determine efficient methods for shipping large quantities of items that enable lower costs and faster delivery times.

In many cases, a seller may wish to offer beneficial shipping options to users of a website associated with the seller, without selling items using a website associated with a separate online store. The online store may wish to offer beneficial shipping options to users that have chosen to subscribe to this service of the online store, even for particular items that are purchased using other websites associated with various sellers.

Described in this disclosure are systems for enabling purchase fulfillment options, such as expedited or reduced-cost shipping benefits, to be used for the purchase, rental, or lease of particular items when the location associated with the user that is obtaining the item and the location of the item provided by the seller are provided to an online store offering such a shipping benefit. For example, a seller may enter into an arrangement with an online store and designate one or more items to be available using the fulfillment options associated with the online store. The seller may provide the designated item(s) to a selected location, such as a warehouse, distribution center, or other type of location associated with the online store, and may provide authorization to the online store to use data associated with the seller to facilitate purchase transactions and shipment of items. The online store may then provide data to the seller to cause presentation of a control, such as a widget, on the seller website. When a user accesses a portion of the website associated with one of the designated items, an authorization status associated with the designated item, or with the seller, may be determined, which may indicate that the item is eligible for use with one or more shipping benefits and an indication of delivery times associated with those benefit(s). Data associated with the user may be acquired, such as an IP address or other type of network address, an identifier indicative of the item that was viewed, and so forth. The data associated with the user may be used to determine an approximate location of the user device used to access the website. Based on the location of the item, the approximate location of the user device, and in some cases, characteristics of the item or of shipping entities that may transport the item, a first delivery time for transport of the item to the approximate location of the user device may be determined. The first delivery time may be presented within the control on the seller website. In other implementations, a preselected delivery time may be presented without determining the first delivery time based on the approximate location of the user device. In still other implementations, presentation of the first delivery time may be omitted, and the control may present a prompt for providing authentication information to determine a delivery time or other characteristics for shipment of the item using the fulfillment options of the online store.

A user intending to purchase the item using the indicated shipping benefit may Interact with the control to provide authentication information. For example, the control may include an interface to receive information to access a user account of the user that is associated with the online store, or interaction with the control may cause presentation of such an interface. After the user is authenticated, a determination may be made that the user account associated with the user is eligible to receive items using the indicated shipping benefit, such as by determining membership of the user account in a program associated with the shipping benefits, and a location associated with the user account may be determined. For example, data indicative of an authorization status of a user may be determined, the authorization status indicating eligibility of the user to receive items using the shipping benefit. Continuing the example, an online store may offer a subscription or membership-based service, and subscription or membership may grant a user the authorization status to utilize a particular shipping benefit. In other cases, creation or authentication of a valid user account may cause a user to be eligible to deliver items using a shipping benefit. In some implementations, user may provide or may have previously provided one or more addresses or other indications of location to the online store. In other implementations, the user may input an address or other indication of location. Based on the location associated with the user account, a second delivery time for transport of the item to the location associated with the user account may be determined, and the second delivery time may be presented within the control on the seller website. In some cases, the user may input or select a particular location in addition to or in place of determining a location associated with the user account. For example, a user intending to order an item to be delivered to another location as a gift or to a specific address while the user is traveling may input or select an address other than a preselected or default address associated with the user account.

The control, or another feature on the seller website, may be used to receive input associated with a purchase, rental, or lease of the item. In response to the input, order data may be generated to cause the item to be transported from the known location of the item, such as a warehouse or distribution facility associated with the online store, to the location associated with the user account or provided by the user. In cases where multiple locations are associated with a user account, user input may be used to select a particular location for transport of the item. In some implementations, payment data associated with the user account may be used by the online store to process the purchase transaction. For example, the payment data may indicate one or more payment instruments, such as credit instruments, third-party payment processors, a payment processor associated with the online store, or other methods for providing payment for the item. In some implementations, if multiple payment instruments are associated with a user account, user input may be used to select a particular payment instrument from among a subset of payment instruments permitted to be used to purchase items from the seller website using the shipping benefit provided by the online store. Collection of payment information by the online store that provides the shipping benefit may facilitate future processes associated with transport of the item, such as delays or irregularities associated with a shipper or with the item, processing of item returns by the user, and so forth.

In some cases, a user may provide input to purchase, using a seller website, a first item associated with a shipping benefit provided by the online store, and a second item that is not associated with the shipping benefit. In some implementations, first order data indicative of the first item may be generated and used to facilitate transport of the item from a first location associated with the item to a second location associated with the user account of the user, while second order data indicative of the second item may be provided to a computing device associated with the seller to enable the seller to facilitate transport of the second item to a location indicated by the user. In some implementations, the online store may determine payment data and process payment for both the first item and the second item. For example, a user may complete a single payment transaction to purchase each selected item if the payment data is processed by the online store. In other implementations, the seller website may determine payment data and facilitate the purchase transaction for the second item.

In some implementations, performance of one or more requirements by the seller may be determined and may be used to determine the information presented in the control of the seller website. For example, if a seller does not maintain at least a threshold amount of inventory for a particular item at a location from which the item may be transported by a shipper associated with the online store, presentation of information regarding a shipping benefit within the control may be discontinued on webpages associated with items for which the threshold amount of inventory is not maintained.

Implementations described herein may therefore enable users that are eligible to receive a shipping benefit associated with an online store to receive this benefit when purchasing, leasing, renting, or otherwise obtaining designated items from another seller that has elected to provide the items using the fulfillment systems associated with the online store. Information regarding the shipping benefit may be provided for display on a seller website, and updated as additional data regarding a user or an item is determined, such as by a user providing authentication information to access a user account associated with the online store, and in some cases also providing a selected delivery location. When items are purchased, rented, or leased, payment and order information may be provided via the control to the online store to enable items to be provided to a user with the indicated shipping benefit. In cases where only certain items selected by a user are eligible for the indicated shipping benefit, order data for other items may be provided to the seller. Payment transactions for the other items may selectively be completed by the online store or by the seller.

Figure 1B:
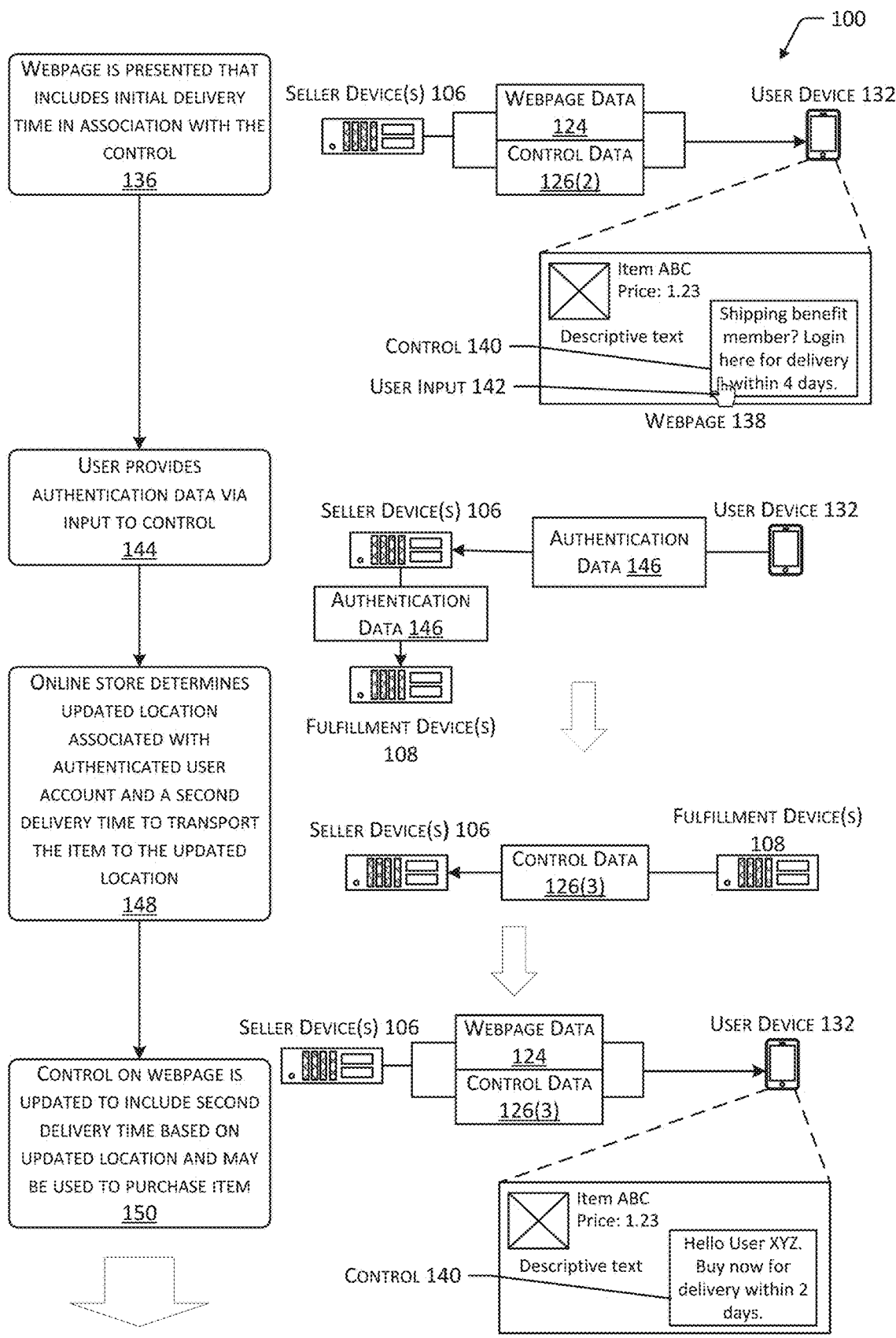
Figure 1C:
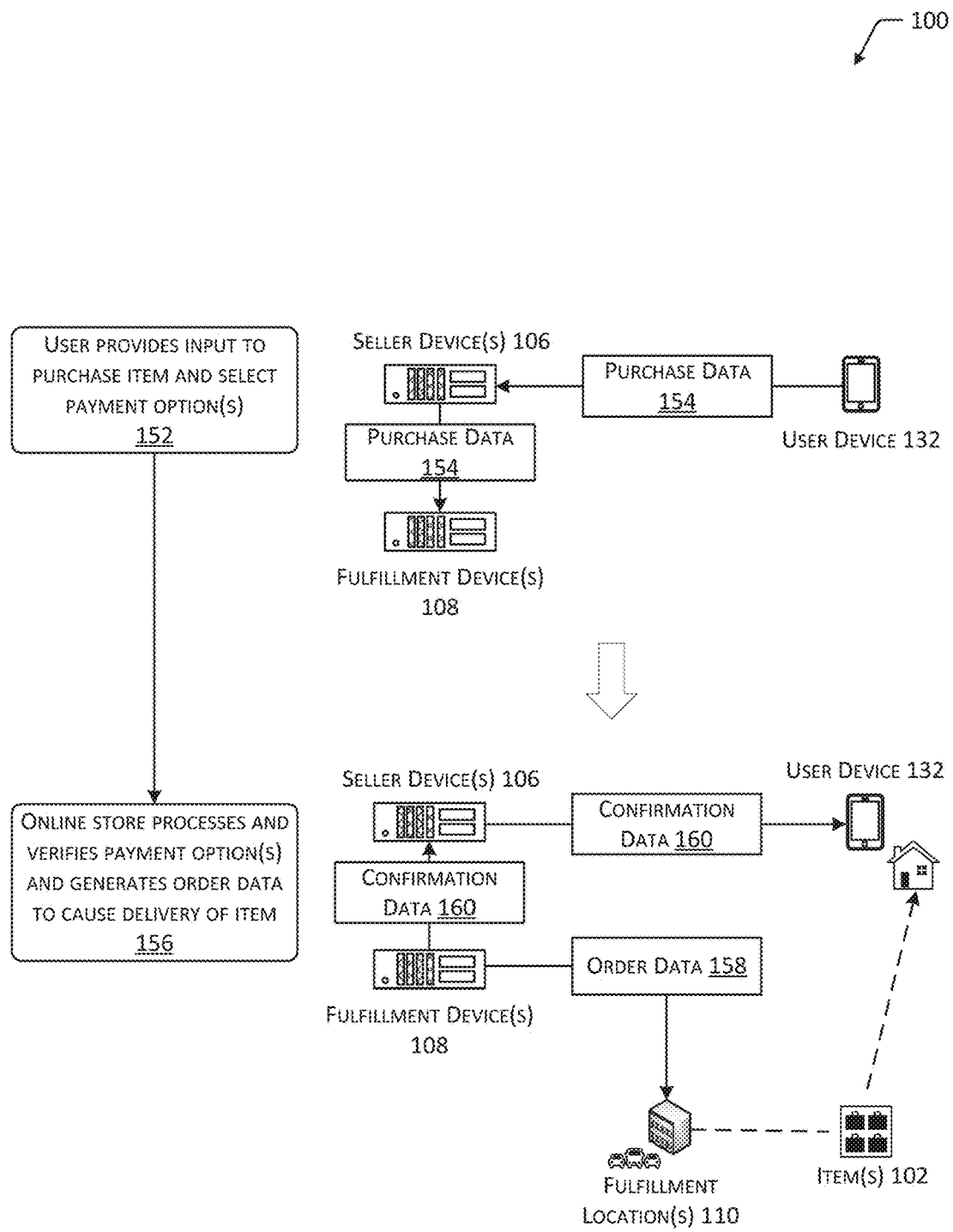

FIGS. 1A-1C illustrate an implementation of a process 100 for using a shipping benefit associated with an online store to transport items 102 to a user of a website associated with a seller. As shown in FIG. 1A, at block 104 a seller may provide data to an online store indicating one or more items 102 to be shipped using a shipping benefit associated with the online store. For example, FIG. 1A depicts one or more seller devices 106 communicating data to one or more fulfillment devices 108. The seller device(s) 106 may include one or more servers, personal computing devices, portable computing devices, and so forth. For example, the seller device(s) 106 may include one or more servers associated with a website that a seller uses to offer one or more items 102 for purchase, lease, rental, subscription, and so forth. The fulfillment device(s) 108 may include one or more of the types of computing devices described with regard to the seller device(s) 106. For example, the fulfillment device(s) 108 may be associated with an online store that offers items 102 associated with multiple sellers for purchase, processes payment transactions for the items 102, coordinates shipment of the items 102 to users, and so forth. Continuing the example, the fulfillment device(s) 108 may be associated with a fulfillment system that includes various fulfillment locations 110, such as warehouses, distribution centers, and so forth that are at various geolocations, and various shipping entities that may be associated with the online store or may be engaged by the online store to transport items 102.

The seller device(s) 106 may provide item data 112, indicative of the item(s) 102 to be transported using the shipping benefit of the online store, to the fulfillment device(s) 108. Item data 112 may include one or more identifiers indicative of items 102, such as a stockkeeping unit (SKU). In some implementations, item data 112 may include other information regarding one or more items 102, such as an item name, brand, manufacturer, price, weight, dimensions, descriptive text for the item(s) 102, one or more images of the item(s) 102, other characteristics of the item(s) 102, and so forth. The seller device(s) 106 may also provide seller data 114 to the fulfillment device(s) 108. Seller data 114 may include one or more identifiers indicative of the seller, one or more characteristics of the seller, seller website, or seller device(s) 106, preferences of the seller regarding sale, storage, or transport of items 102, performance history of the seller, authorization by the seller to use item data 112 and seller data 114 to facilitate the shipment of items 102 to users, and so forth. Seller data 114 may also include locations associated with the seller, with items 102 indicated in the item data 112, with customers of the seller, and so forth.

At block 116, the seller may provide at least a threshold quantity of the items 102 to a designated fulfillment location 110. For example, an online store may maintain multiple fulfillment locations 110 from which stored items 102 may be transported to locations of users that purchase the items 102. Continuing the example, fulfillment locations 110 may include warehouses, distribution centers, lockers, or other types of storage or containment facilities. The fulfillment device(s) 108 may provide location data 118 indicative of one or more fulfillment locations 110 to which the seller is to provide specified quantities of items 102. In some implementations, the location data 118 may be determined based on the item data 112, and seller data 114, such as the geolocation(s) of one or more seller locations 120 where items 102 transported by the seller are stored, previous locations where items 102 have been transported, such as when purchased by a user, characteristics of the items 102 that may correspond to particular characteristics of a fulfillment location 110, such as a fulfillment location 110 suitable to items 102 having particular dimensions, temperatures, and so forth.

At block 122, the online store may provide data to the seller to cause a control indicating a shipping benefit to be presented on the seller website. For example, one or more of the seller device(s) 106 may maintain webpage data 124 associated with a seller website. The webpage data 124 may be associated with various webpages that may present information regarding particular items 102, receive user input such as search queries or selection of navigational links, enable purchases of items 102, the addition of items to electronic lists, and so forth. The fulfillment device(s) 108 may provide control data 126(1) that may be used to cause a control, such as a widget, to be presented on one or more webpages of the seller website. The seller device(s) 106 may incorporate code or other elements of the control data 126(1) into the webpage data 124. For example, the control may be presented on particular webpages associated with the items 102 indicated in the item data 112, and may present information regarding a shipping benefit of the online store that is available for transporting the item 102 shown in the webpage on which the control is presented, such as expedited shipping, free or reduced-cost shipping, and so forth. Continuing the example, the fulfillment device(s) 108 may periodically provide control data 126 to the seller device(s) 106 to modify the information presented within the control. In some cases, control data 126 may be used to cause the control to cease to be presented or to present information indicating that a shipping benefit for an item 102 is unavailable, such as if the quantity of items 102 stored at the fulfillment location(s) 110 falls below a threshold amount. As another example, information presented using the control, such as an estimated delivery time, may change as information regarding a user or item 102 changes. For example, if a user selects or inputs a particular address or other indicator of location, the estimated delivery time associated with the purchase of an item 102 may change.

At block 128, a user may access a webpage associated with an item 102 indicated in the item data 112. An authorization status associated with the item 102 or with the seller may be determined, which may indicate that the item 102 is eligible to be transported using one or more shipping benefits that may be presented using the control within the seller webpage. User data 130 associated with the user, user account, or user device 132 used to access the webpage may be determined. For example, FIG. 1A depicts a user device 132 receiving webpage data 124 from the seller device(s) 106, which may cause the user device 132 to present one or more webpages based on the webpage data 124. The presented webpage(s) may include one or more controls associated with the control data 126(1) provided by the fulfillment device(s) 108. While FIG. 1A depicts the user device 132 as a portable computing device, such as a smartphone, the user device 132 may include any number and any type of computing devices including, without limitation, the types of computing devices described with regard to the seller device(s) 106 and fulfillment device(s) 108. When the user device 132 accesses the seller website, the seller device(s) 106, or in some implementations the fulfillment device(s) 108, may determine user data 130 indicative of the user device 132. For example, the user data 130 may include a network address, such as an internet protocol (IP) address, associated with the user device 132. In some implementations, user data 130 may include an indication of characteristics of the user device 132, such as a type of device, components of the user device 132, browser applications or other applications executed by the user device 132, and in some cases, a user account associated with the user device 132 if a user account is able to be determined based on other user data 130. User data 130 may be used to determine an estimated location of the user device 132.

For example, at block 134, an initial user location may be determined based on the user data 130 and may be used to determine a delivery time for inclusion in the control. Continuing the example, FIG. 1A depicts the fulfillment device(s) 108 receiving the user data 130 and providing control data 126(2) that may be used to modify the information presented in the control. For example, based on the estimated location of a user device 132, which may be determined based on a network address or other aspect of the user data 130, based on the fulfillment location(s) 110 associated with the item(s) 102, and in some cases based on characteristics of the item(s) 102 or of shipping entities that are able to transport the item(s) 102, the fulfillment device(s) 108 may determine an estimated delivery time associated with transport of the item(s) 102 from a fulfillment location 110 to an estimated location of the user device 132. The control data 126(2) may cause the control presented within a portion of the seller website to present data indicative of the estimated delivery time. In other implementations, the control may present a preselected delivery time independent of the estimated location of the user device 132. In still other implementations, the control may present information regarding the availability of one or more shipping options without presenting an estimated delivery time. In some cases, determination of the estimated location of the user device 132 may be omitted if the estimated location is not used to determine information for inclusion in the control.

As shown in FIG. 1B, at block 136, a webpage 138 may be presented, on the user device 132, that includes an initial delivery time shown in association with the control 140. For example, the seller device(s) 106 may provide webpage data 124, which may include or be accompanied by the control data 126(2) for presenting the estimated delivery time within the control 140, to the user device 132. A browser application or other type of application executing on the user device 132 may cause presentation of a webpage 138 based on the webpage data 124 and control data 126(2). For example, the webpage 138 is shown presenting information regarding an item 102, such as an item name, price, descriptive text, one or more images depicting the item 102, and so forth. The webpage 138 may also include a control 140, such as a widget, frame, or other region or type of feature. As shown in FIG. 18, the control 140 may include information regarding an estimated delivery time based on the estimated location of the user device 132 and based on a fulfillment location 110 where the item 102 described in the webpage 138 is stored. For example, the online store associated with the fulfillment device(s) 108 may offer one or more shipping benefits to users that have subscribed to a membership program, to users that have created a user account associated with the online store, or to other groups of users. The control 140 may be usable to provide input or access an interface that may be used to authenticate a user, access a user account, and so forth. For example, FIG. 1B depicts user input 142 provided to the control 140 within the webpage 138. As described previously, in some cases, the control 140 may include a preselected delivery time rather than an estimated delivery time determined based on an estimated location of the user device 132. In other cases, inclusion of a delivery time may be omitted. For example, the control 140 may include a prompt indicating the possible availability of shipping benefits without indicating a delivery time.

At block 144, the user may provide authentication data 146 via input to the control 140. The authentication data 146 may include a user account name and password, or other types of credentials, data, or input that may be used to authenticate the user, user account, or user device 132. The fulfillment device(s) 108 may receive and process the authentication data 146 and determine proper authentication of the user, user account, or user device 132. In some implementations, authentication data 146 may be exchanged using one or more other computing devices. For example, in response to user input 142 to the control 140, the fulfillment device(s) 108 or a separate computing device associated with user authentication may send a prompt for authentication data 146 to the user device 132 or to another computing device associated with a user account. In response to authentication data 146 received from the user device 132 or other device that receives a prompt for authentication data 146, a separate computing device, if used, may transmit at least a portion of the authentication data 146 or an indication of a successful authentication to the fulfillment device(s) 108. In some cases, in response to user input 142 provided to the control 140, a token, tracking cookie, or other type of data may be sent to the user device 132 to enable subsequent access to the webpage 138 or other portions of the seller website by the user device 132 to be associated with the determined user account.

At block 148, the online store may determine an updated location associated with an authenticated user account, and a second delivery time to transport the item 102 from a fulfillment location 110 to the updated location. In some implementations, the online store may determine an authorization status for the user account that indicates authorization to receive items 102 using one or more shipping benefits, such as by verifying that the user account is subscribed to a membership program or other type of program for receiving the shipping benefit(s). The authenticated user account may be associated with one or more addresses or other indications of location. A physical address associated with the user account may more accurately represent a possible location for delivery of an item 102 than an estimated location determined based on a network address of the user device 132. For example, a physical address associated with a user account may represent a location of a specific building, while an estimated location associated with a network address may represent a larger geographical area. As another example, if a user is accessing a seller website at a location remote from a preferred delivery address, such as while traveling, the estimated location associated with a network address may not accurately represent a delivery location associated with a user account, while an address associated with the user account may be used to determine delivery times for items 102 independent of the current location of a user device 132. In such a case, a possible delivery time to transport an item 102 to the updated location may differ from the initial delivery time presented in the control 140. For example, FIG. 18 depicts the fulfillment devices 108 providing additional control data 126(3) to the seller device(s) 106. The additional control data 126(3) may cause the control 140 to present an updated delivery time based on a location associated with the user account. In other implementations, the user device 132 may provide input selecting or indicating an address or other type of location. For example, a user may intend to deliver an item 102 to a location other than a selected or default location associated with a user account, such as when purchasing an item 102 as a gift or when ordering an item 102 for delivery while the user is traveling. In such a case, the control 140 may be updated to present a delivery time based on the location selected or input by the user.

At block 150, the seller device(s) 106 may provide webpage data 124, that includes or is accompanied by the updated control data 126(3), to the user device 132 to cause presentation of a webpage 138 that includes updated information within the control 140. Continuing the example, based on the location associated with the authenticated user account or provided by the user, the control 140 may present a different estimated delivery time than the initial delivery time presented before authentication of the user account. The control 140 or one or more other features of the webpage 138 may be used to complete a purchase transaction associated with the item 102, and to select for the item 102 to be transported to the location associated with the user account based on the shipping benefit indicated in the control 140.

As shown in FIG. 1C, at block 152, the user may provide input to the webpage 138 to purchase, lease, or rent the represented item 102 and select one or more payment options. For example, in response to user input 142 to initiate a purchase transaction for the item 102, the user may be prompted to select one or more payment instruments or other types of payment options, one or more shipping methods that may include the shipping benefit indicated in the control 140, other options associated with purchase or transport of the item 102, and so forth. Purchase data 154 indicative of the purchase transaction may be provided to the fulfillment device(s) 108. The purchase data 154 may include an indication of a payment option stored in association with the user account, or a new payment option added Via user input 142, a selection of a shipping option, input or selection of a location if the user account is associated with more than one location, and so forth.

At block 156, the online store may process and verify the selected payment option(s), then generate order data 158 to cause delivery of the item 102. For example, order data 158 may include information indicative of the item(s) 102 to be included in a shipment, the location associated with the user account or indicated by the user, a delivery time or other characteristics associated with transport of the item(s) 102, and so forth. In response to the order data 158, a shipping entity associated with the online store may transport the item(s) 102 from a fulfillment location 110 to the location associated with the user account or indicated by the user. After processing the purchase data 154, the fulfillment device(s) 108 may generate confirmation data 160 indicative of the purchase transaction, which may include information regarding the item(s) 102, shipping option(s), payment option(s), and so forth. The confirmation data 160 may be provided to the seller device(s) 106 and the user device 132. In some implementations, one or more of the seller device(s) 106 or the fulfillment device(s) 108 may determine that purchase and transport of the selected item(s) 102 to the location associated with or indicated by the user account is permitted prior to generating the order data 158 and confirmation data 160. For example, if sale or transport of a particular type of item is disallowed in a geographic region or is subject to restrictions such as copyright protection, purchase transactions associated with such items that may cause prohibited sale or transport may be prevented.

Figure 2A:
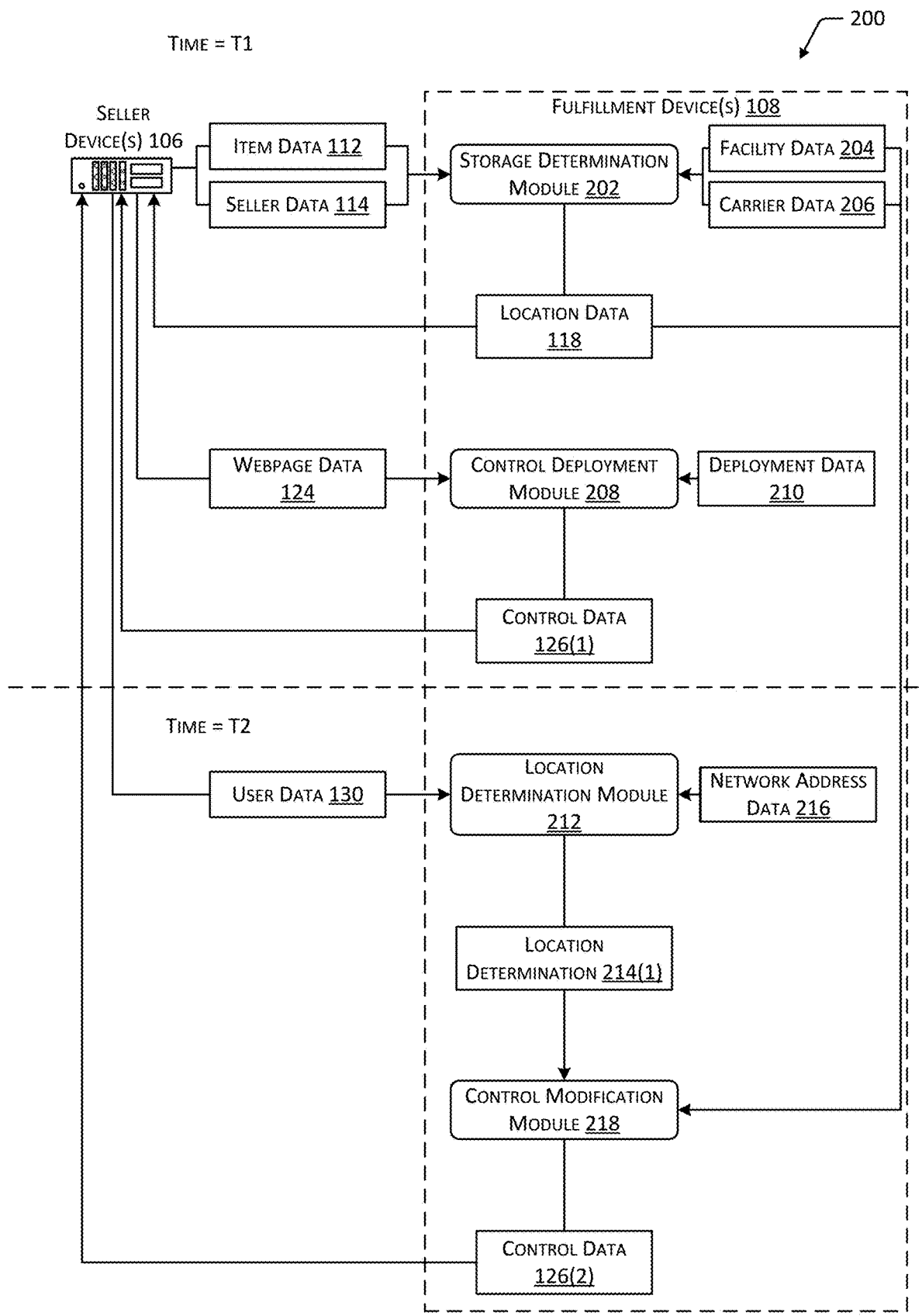
FIGS. 2A-2B are block diagrams depicting use of a fulfillment device or other type of computing device to provide data regarding transport of items for presentation on a seller website, and generating order data in response to a purchase transaction by a user.
Figure 2B:
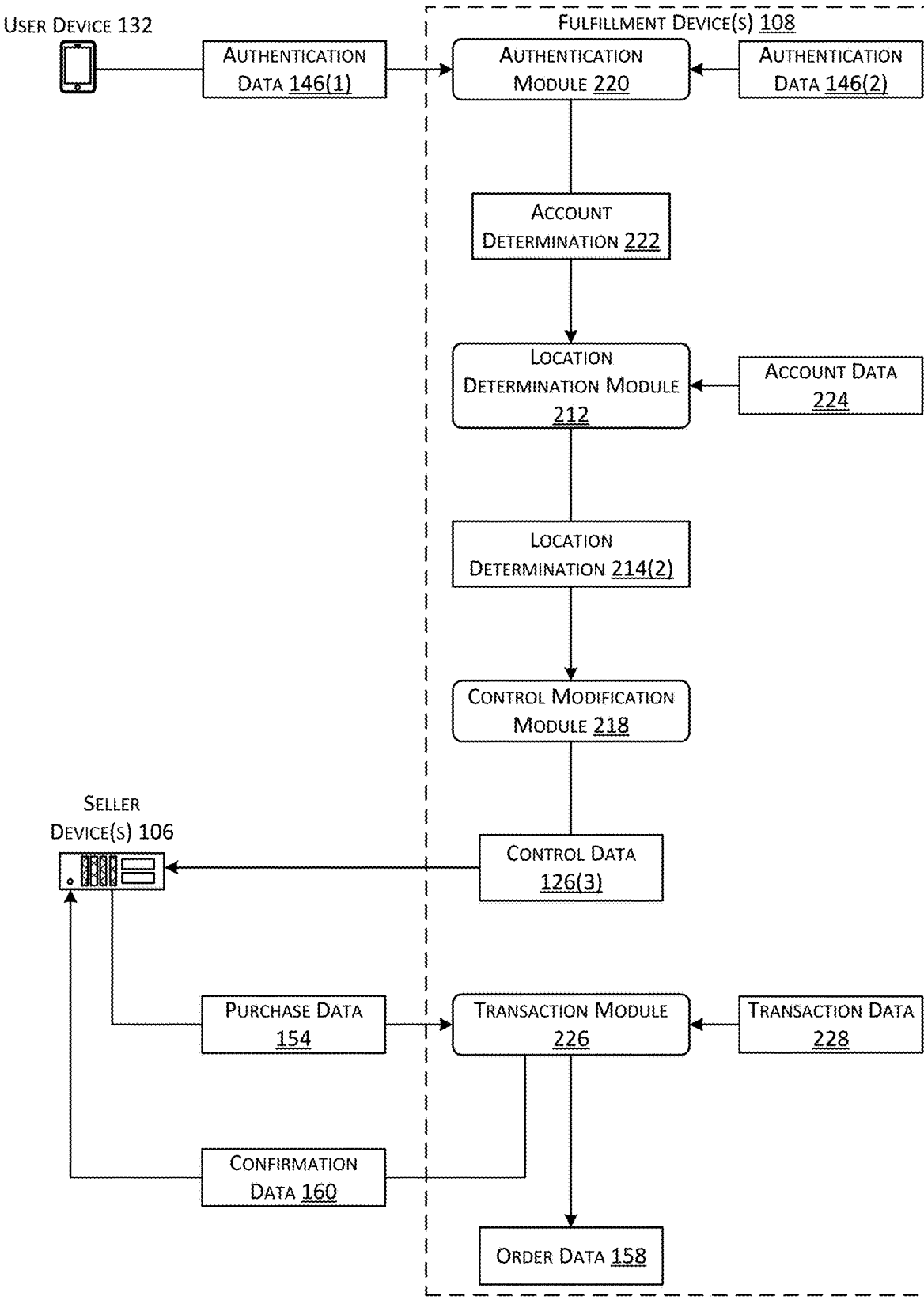

FIGS. 2A-2B are block diagrams 200 depicting use of a fulfillment device 108 or other type of computing device to provide data regarding transport of items 102 for presentation on a seller website, and generating order data 158 in response to a purchase transaction by a user. In other cases, a transaction associated with a user may include a lease, rental, or subscription. At a first time T1, item data 112 and seller data 114 may be received from one or more seller devices 106. As described with regard to FIG. 1A, Item data 112 may include one or more item identifiers, an item name, brand, manufacturer, price, weight, dimensions, descriptive text, images, and so forth. Seller data 114 may include one or more identifiers indicative of the seller, one or more characteristics of a seller, locations associated with the seller, preferences of the seller regarding sale, storage, or transport of items 102, performance history of the seller, and so forth. A storage determination module 202 associated with the fulfillment device(s) 108 may receive the item data 112 and seller data 114 and determine location data 118 indicative of one or more fulfillment locations 110 for storage of one or more items 102 associated with the seller. For example, particular fulfillment locations 110 may be suitable for items having certain dimensions, weights, or storage requirements. As another example, particular fulfillment locations 110 may be located closer to, or at a location that facilitates transport of items 102 to, locations where customers of a seller have historically requested delivery of items 102. As yet another example, particular fulfillment locations 110 may be located closer to, or at a location that facilitates transport from, locations where the seller stores items. The storage determination module 202 may access facility data 204 indicative of fulfillment locations 110 and the characteristics and capabilities thereof, and carrier data 206 indicative of the capabilities of one or more shippers and the locations served by or accessible to the shippers, and may determine the location data 118 based on correspondence between the facility data 204, carrier data 206, item data 112, and seller data 114.

A control deployment module 208 associated with the fulfillment device(s) 108 may determine control data 126(1) for incorporation of a widget or other type of control 140 within the seller website. For example, the control deployment module 208 may access webpage data 124 indicative of one or more webpages 138 associated with the items 102 indicated in the item data 112. The control deployment module 208 may also access deployment data 210 indicative of content to be included in the control 140, and in some cases, one or more rules, formats, locations, and so forth that may be used to determine particular locations within a webpage 138 and particular characteristics of the control 140 to be presented.

At a second time T2, a user may access a webpage 138 associated with one of the items 102 indicated in the item data 112, and user data 130 indicative of the user may be determined. For example, user data 130 may include a network address associated with a user device 132, or other characteristics of a user device 132, one or more networks used by the user device 132, interactions with the webpage 138 and input received from the user device 132, and so forth. Based on at least a portion of the user data 130, such as a network address, a location determination module 212 associated with the fulfillment device(s) 108 may generate a location determination 214(1) indicative of an estimated geolocation of the user device 132. For example, the location determination module 212 may access network address data 216 that associates network addresses, or other characteristics of the user data 130, with corresponding estimated geolocations.

A control modification module 218 associated with the fulfillment device(s) 108 may determine control data 126(2) to modify the control 140 presented in the webpage 138 of the seller website and send the control data 126(2) to the seller device 106. In some implementations, the control data 126(2) may be determined in response to determining an authorization status associated with the seller or with the item 102 presented in the webpage 138. For example, the authorization status may indicate eligibility to offer one or more shipping benefits for transport of the item 102. Based on the location determination 214(1) indicative of the estimated location of the user device 132, based on facility data 204 and carrier data 206 indicative of capabilities of fulfillment locations 110 and shippers of items 102, and based on the location data 118 indicative of the fulfillment locations 110 associated with the item 102 presented in the webpage 138 accessed by the user device 132, an estimated delivery time may be determined to transport one or more items 102 from a fulfillment location 110 to the estimated location of the user device 132. The control data 126(2) may update the control 140 to present information indicative of the estimated delivery time. In other implementations, generation of a location determination 214(1) may be omitted, and the control 140 may present a preselected delivery time, or presentation of a delivery time may be omitted and the control 140 may present other information, such as a prompt indicating the possible availability of particular shipping options.

As shown in FIG. 2B, at a third time T3, the user device 132 may provide authentication data 146(1) to authenticate a user associated with the user device 132, such as by providing information to access a user account. For example, the control 140 may be configured to receive user input 142 to authenticate a user or access a user account, or may cause a frame or other type of interface to be presented to receive such user input 142. An authentication module 220 may determine correspondence between the authentication data 146(1) associated with the user device 132 and authentication data 146(2) indicative of a correct or expected authentication. Based on the authentication data 146(1), the authentication module 220 may generate an account determination 222 indicative of a user account associated with the authentication data 146(1) provided by the user device 132. In other implementations, a separate computing device may be used to receive authentication data 146(1) from the user device 132 and may provide an authentication determination to the fulfillment device(s) 108.

The location determination module 212 may generate a location determination 214(2) based on the account determination 222 indicative of the user account, and account data 224 that may associate one or more locations (such as physical addresses or other indication of location) with the determined user account. In some implementations, the account data 224 may indicate an authorization status that indicates that the user account is eligible to receive items 102 using one or more shipping benefits, and an updated location and delivery time may be determined in response to the authorization status. For example, a user account may be associated with a single physical address, or with multiple addresses with a particular address designated as a main, primarily, or default address for delivery of items 102. In other implementations, a user may be prompted to select or input a particular address, such as when multiple addresses are associated with the user account or if a user intends to request delivery of an item to a location other than a location associated with the user account. The control modification module 218 may generate control data 126(3) that indicates an updated delivery time based on the fulfillment location 110 of the item 102 indicated in the accessed webpage 138 and the location determination 214(2) associated with the user account. The control data 126(3) may be provided to the seller device 106 to cause the control 140 to present information indicative of the updated delivery time.

If a user initiates a purchase transaction for the presented item 102, or another type of transaction such as a lease, rental, or subscription, a transaction module 226 associated with the fulfillment device(s) 108 may receive purchase data 154 indicative of one or more characteristics of the purchase transaction, such as one or more payment or shipping options. Based on transaction data 228, which may include information regarding various payment and shipping options, and other data for completing purchase transactions, verifying and validating payment, and so forth, the transaction module 226 may generate order data 158 to cause transport of the item(s) 102 indicated in the purchase data 154 to a location associated with the user account, and confirmation data 160 indicative of the completed purchase transaction.

Figure 3:
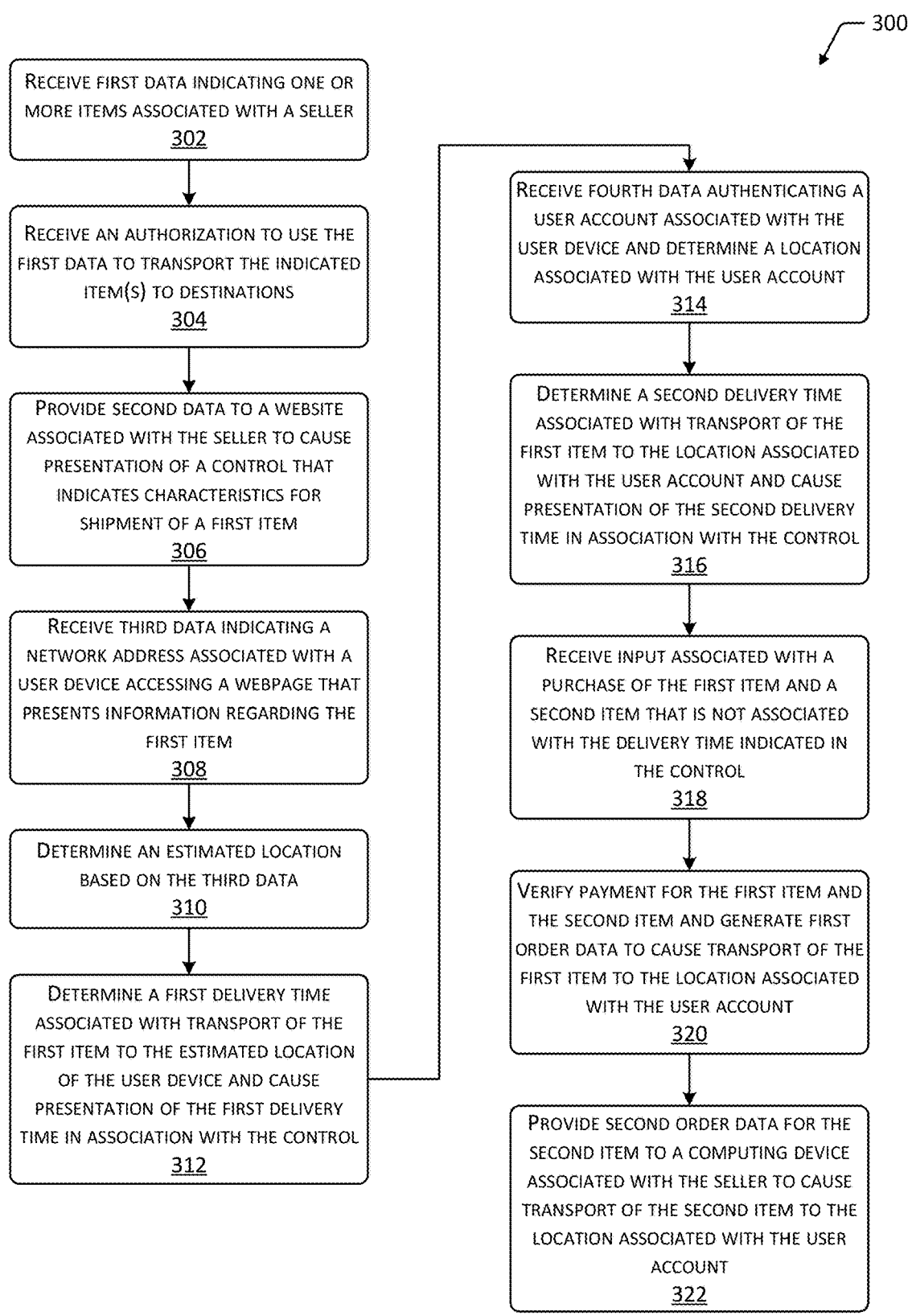
FIG. 3 is a flow diagram illustrating an implementation of a method for using a shipping benefit associated with an online store to transport a first item associated with a seller website, while enabling the seller to transport a second item.

FIG. 3 is a flow diagram 300 illustrating an implementation of a method for using a shipping benefit associated with an online store to transport a first item 102 associated with a seller website, while enabling the seller to transport a second item 102. At block 302, first data indicating one or more items 102 associated with a seller may be received. For example, as described with regard to FIGS. 1A and 2A, item data 112 and seller data 114 indicative of characteristics of a seller, seller device 106, or seller website, and characteristics of one or more items 102 to be transported using shipping methods associated with the online store, may be determined. The first data may be used to determine one or more fulfillment locations 110 for storage of the item(s) 102, quantities of the item(s) 102 to be stored, and so forth.

At block 304, an authorization to use the first data to transport the indicated item(s) 102 to destinations may be received. For example, information regarding items 102 offered by a seller, locations of customers of the seller, transaction histories associated with the seller, locations served by the seller, and so forth may be disregarded or maintained in a confidential manner, and may remain unused until an authorization from a seller to use such information is received. Use of the information may be limited to purposes that have been authorized by the seller.

At block 306, second data may be provided to a website associated with the seller to cause presentation of a control 140 that indicates characteristics for shipment of a first item 102. For example, the second data may include computer code to cause a widget or other type of control 140 to be presented in association with a webpage 138 that includes information regarding an item 102 indicated in the first data. The Information presented using the control 140 may include estimated delivery times or other options or characteristics associated with transport of the item 102 indicated in the webpage 138. The control 140 may function to receive user input 142 or other interactions, which may be used to indicate preferred shipping options, authenticate a user, and so forth.

At block 308, third data indicating a network address associated with a user device 132 accessing a webpage 138 that presents information regarding the first item 102 may be received. For example, an IP address or other identifiers or characteristics associated with a user device 132 may be determined when a user device 132 accesses a webpage 138 associated with the first item 102. Based on the network address or other characteristics of the user device 132, network(s) used by the user device 132, or other characteristics of access by the user device 132, information regarding the user device 132, such as an estimated physical location may be determined.

For example, at block 310, an estimated location associated with the user device 132 may be determined based on the third data. As described with regard to FIGS. 1A and 2A, network address data 216 or other types of data may be used to determine a location associated with an IP address, other type of network address, or other characteristic of a user device 132, network, or access by a user device 132. In many cases, the estimated location determined based on a network address may be approximate and subject to potential inaccuracy. For example, an IP address may correspond to a large geographic area rather than a precise location. However, the estimated location may enable an estimated delivery time for one or more items 102 to be determined, based on an average or worst-case estimate of a time to transport items 102 to any portion of a geographic area associated with a network address.

For example, at block 312, a first delivery time associated with transport of the first item 102 to the estimated location of the user device 132 may be determined. The control 140 within the seller webpage 138 may be caused to present the first delivery time. Continuing the example, as described with regard to FIGS. 1B and 2A, information regarding an initial estimated delivery time may be presented prior to authentication of a user and determination of a physical address associated with an account. Presentation of the estimated delivery time in association with the control 140 may inform a user regarding the availability of a shipping benefit, which may cause the user to interact with the control 140 to create or authenticate a user account. As described with regard to FIGS. 1A through 2B, in other implementations, determination of an estimated delivery time based on a network address or other information used to determine an estimated location of a user device 132 may be omitted, and the control 140 may present a preselected delivery time or may omit presenting a delivery time.

At block 314, fourth data authenticating a user account associated with the user device 132 may be received, and a location associated with the user account may be determined. For example, the control 140 or another feature of the seller website, the fulfillment device(s) 108, or another computing device may be configured to receive authentication data 146 that may be used to authenticate a user, user device 132, or user account, such as by accessing a user account using a username, password, and so forth. An authorization status of the user account to access the shipping options associated with the control 140 may then be determined. For example, a user account may be subscribed to a membership program or other type of program that is eligible to use particular shipping options. The user account may be associated with one or more physical addresses, which may indicate one or more geolocations associated with the user account. A physical address associated with a user account may indicate a more precise geolocation than an area that corresponds to a network address. Therefore, a location determined based on the address associated with a user account may be more accurate than the previously-determined location based on user data 130 and may be used to determine a more accurate estimated delivery time to provide items 102 to the location associated with the user account. In other implementations, a user associated with the user account may input or select an address or other indication of location. For example, a user may intend to cause an item 102 to be delivered to a location not associated with the user account, such as when purchasing a gift for another individual or purchasing an item 102 while traveling.

At block 316, a second delivery time associated with transport of the first item 102 to the location associated with the user account or provided by the user may be determined. Information associated with the second delivery time may be presented in association with the control 140 on the seller webpage 138. For example, based on the known location associated with the user account or provided by the user, a precise delivery time may be presented to enable a user to recognize the shipping benefit associated with the online store and, if desired, to initiate a purchase transaction for the first item 102 that includes use of the shipping benefit associated with the online store.

Continuing the example, at 318, input associated with the purchase of the first item 102 may be received. Input associated with a purchase of a second item 102 may also be received. The second item 102 may not be associated with the delivery time indicated in the control 140. For example, the second item 102 may be sold by the seller directly, without utilizing the fulfillment methods associated with the online store.

At block 320, payment for the first item 102 and the second item 102 may be verified, and order data 158 to cause transport of the first item 102 to the location associated with the user account may be generated. For example, purchase data 154 associated with a user device may include Information regarding one or more payment instruments, selected shipping characteristics, and so forth. Order data 158 generated by the fulfillment devices 108 may be provided to a computing device associated with a fulfillment location 110, shipping entity, and so forth to cause transport of the first item 102 to the location associated with the user account.

Because the second Item 102 is not associated with the shipping benefit indicated in the control 140, at block 322, second order data 158 may be provided for the second item 102 to a computing device associated with the seller to cause transport of the second item 102 to the location associated with the user account. For example, a seller may facilitate delivery of items 102 not associated with the shipping benefit of the online store using similar or dissimilar methods of transporting items 102.

Figure 4:
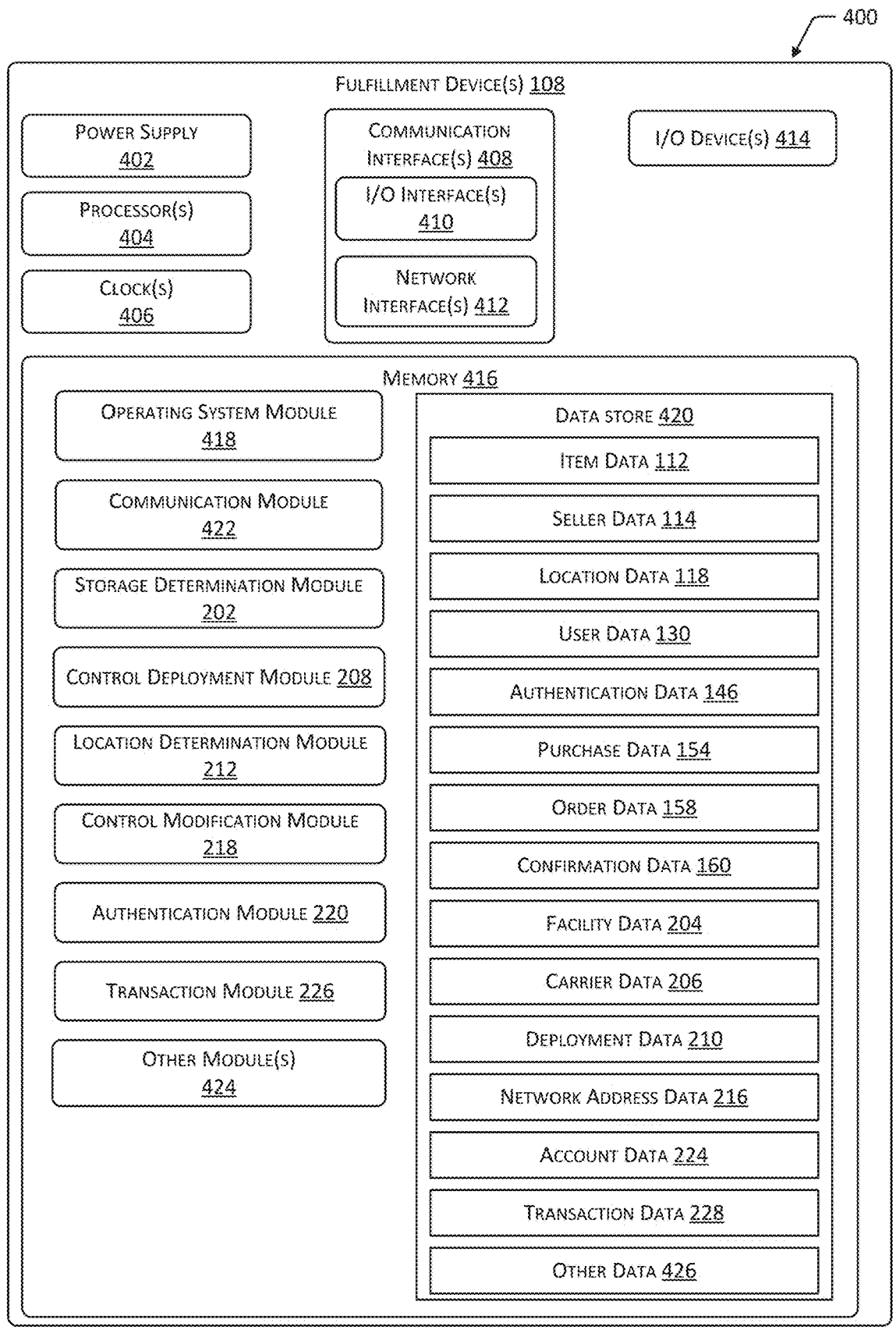
FIG. 4 is a block diagram depicting an implementation of a fulfillment device or other type of computing device that may be used to determine characteristics associated with transport of items to a location associated with a user.

FIG. 4 is a block diagram 400 depicting an implementation of a fulfillment device 108 or other type of computing device that may be used to determine characteristics associated with transport of items 102 to a location associated with a user. In some implementations, the fulfillment device(s) 108 may include one or more servers, as shown in FIGS. 1A-1C. In other implementations, the fulfillment device(s) 108 may include one or more other types of computing devices that are able to receive and process item data 112, seller data 114, user data 130, user input 142, purchase data 154, and so forth. Therefore, while FIG. 4 depicts a single block diagram 400 of a computing device such as a fulfillment device 108, any number and any type of computing devices may be used to perform the functions described herein. Additionally, while FIG. 4 describes the components and functions associated with a fulfillment device 108, in other implementations, one or more functions described herein may be performed using a seller device 106, user device 132, or other computing device in communication with a fulfillment device 108.

One or more power supplies 402 may be configured to provide electrical power suitable for operating the components of the fulfillment device(s) 108. In some implementations, the power supply 402 may include a rechargeable battery, fuel cell, photovoltaic cell, power conditioning circuitry, and so forth.

The fulfillment device(s) 108 may include one or more hardware processor(s) 404 (processors) configured to execute one or more stored instructions. The processor(s) 404 may include one or more cores. One or more clock(s) 406 may provide information indicative of date, time, ticks, and so forth. For example, the processor(s) 404 may use data from the clock 406 to generate a timestamp, trigger a preprogrammed action, and so forth. Continuing the example, data from the clock(s) 406 may be used to determine dates and times associated with transport of items 102 between locations.

The fulfillment device(s) 108 may include one or more communication Interfaces 408, such as input/output (I/O) interfaces 410, network interfaces 412, and so forth. The communication interfaces 408 may enable a fulfillment device 108, or components of the fulfillment device 108, to communicate with other computing devices or components of the other computing devices. The I/O interfaces 410 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 410 may couple to one or more I/O devices 414. The I/O devices 414 may include any manner of input devices or output devices associated with the fulfillment device(s) 108. For example, I/O devices 414 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 414 may be physically incorporated with the fulfillment device 108. In other implementations, I/O devices 414 may be externally placed.

The network interfaces 412 may be configured to provide communications between the fulfillment device(s) 108, and other devices, such as the I/O devices 414, routers, access points, and so forth. The network interfaces 412 may include devices configured to couple to one or more networks including local area networks (LANs), wireless LANs (WLANs), wide area networks (WANs), wireless WANs, and so forth. For example, the network interfaces 412 may include devices compatible with Ethernet, Wi-Fi, Bluetooth, ZigBee, Z-Wave, 3G, 4G, 5G, LTE, and so forth.

The fulfillment device 108 may include one or more buses or other internal communications hardware or software that allows for the transfer of data between the various modules and components of the fulfillment device 108.

As shown in FIG. 4, the fulfillment device 108 may include one or more memories 416. The memory 416 may include one or more computer-readable storage media (CRSM). The CRSM may be any one or more of an electronic storage medium, a magnetic storage medium, an optical storage medium, a quantum storage medium, a mechanical computer storage medium, and so forth. The memory 416 may provide storage of computer-readable instructions, data structures, program modules, and other data for the operation of the fulfillment device 108. A few example modules are shown stored in the memory 416, although the same functionality may alternatively be implemented in hardware, firmware, or as a system on a chip (SoC).

The memory 416 may include one or more operating system (OS) modules 418. The OS module 418 may be configured to manage hardware resource devices such as the I/O interfaces 410, the network interfaces 412, the I/O devices 414, and to provide various services to applications or modules executing on the processors 404. The OS module 418 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 420 and one or more of the following modules may also be associated with the memory 416. The modules may be executed as foreground applications, background tasks, daemons, and so forth. The data store(s) 420 may use a flat file, database, linked list, tree, executable code, script, or other data structure to store information. In some implementations, the data store(s) 420 or a portion of the data store(s) 420 may be distributed across one or more other devices including other computing devices, network attached storage devices, and so forth.

A communication module 422 may be configured to establish communications with one or more other computing devices. Communications may be authenticated, encrypted, and so forth.

The memory 416 may also store the storage determination module 202. The storage determination module 202 may determine location data 118 indicative of one or more fulfillment locations 110 for storage of one or more items 102. Fulfillment locations 110 may be determined based in part on item data 112 and seller data 114 indicative of characteristics of items 102, such as weight, dimensions, storage requirements, and so forth, and characteristics of a seller, such as locations associated with the seller, locations associated with previous purchase transactions by the seller, and so forth. Fulfillment locations may also be determined based in part on facility data 204 indicative of fulfillment locations 110 and the characteristics and capabilities thereof, and carrier data 206 indicative of the capabilities of one or more shippers and the locations served by or accessible to the shippers.

The memory 416 may additionally store the control deployment module 208. The control deployment module 208 may determine control data 126 for incorporation of a widget or other type of control 140 within a webpage 138. In some implementations, the control deployment module 208 may access webpage data 124 indicative of one or more webpages 138. For example, webpage data 124 may include HTML code or other data that may be used to cause presentation of a webpage 138. The control deployment module 208 may also access deployment data 210 indicative of content to be included in the control 140, and in some cases, one or more rules, formats, locations, and so forth that may be used to determine particular locations within a webpage 138 and particular characteristics of the control 140 to be presented.

The memory 416 may also store the location determination module 212. The location determination module 212 may determine an estimated location associated with a computing device based on user data 130 or other data indicative of a network address or other characteristics of communication with the computing device. For example, the location determination module 212 may access network address data 216 that associates network addresses, or other characteristics of a communication, computing device, networks used by the computing device, and so forth, with corresponding estimated geolocations.

The memory 416 may store the control modification module 218. The control modification module 218 may determine control data 126 to modify a control 140 presented in a webpage 138. For example, control data 126 may indicate an estimated delivery time associated with one or more items 102. The estimated delivery time may be determined based on locations associated with a user and based on one or more fulfillment locations 110 associated with items 102 described in the webpage(s) 138 accessed by the user. For example, if a location associated with a user changes or the location of an item 102 changes, control data 126 that includes an updated estimated delivery time may be provided to a website to cause information presented in association with a control 140 to be changed. Other characteristics associated with transport of an item 102 in addition to or in place of a delivery time may also be presented in association with the control 140 and modified using control data 126.

The memory 416 may also store the authentication module 220. The authentication module 220 may be used to authenticate a user, computing device, or user account, such as by determining correspondence between authentication data 146 received from another computing device and authentication data 146 indicative of a correct or expected authentication. For example, the authentication module 220 may verify the correct input of an account name and password, or other types of authentication. An authenticated user or user account may be used to determine one or more indications of location, such as a physical address, associated with a user account. In some implementations, a separate computing device may receive and process authentication data 146 and provide data indicative of an authentication to the fulfillment device(s) 108.

The memory 416 may additionally store the transaction module 226. The transaction module 226 may be used to complete a purchase transaction for an item 102, or another type of transaction such as a rental, lease, or subscription, such as by receiving purchase data 154 indicative of payment options, shipping options, or other characteristics of a purchase transaction. The transaction module 226 may access transaction data 228, which may include information regarding various valid payment and shipping options, such as payment options that may be available for use with selected shipping benefits, and other data for completing purchase transactions. The transaction module 226 may verify and validate payment and may generate order data 158 to cause transport of the item(s) 102 to a location associated with a user account. The transaction module 226 may also generate confirmation data 160 indicative of completed purchase transactions.

Other modules 424 may also be present in the memory 416. For example, other modules 424 may include permission or authorization modules to enable users to access and modify data associated with one or more computing devices. Other modules 424 may include permission modules to enable a user to opt in or otherwise provide authorization for data associated with sellers, seller devices 106, seller accounts, users, user devices 132, and user accounts to be acquired and used to facilitate purchase and transport of items 102. Other modules 424 may also include encryption modules to encrypt and decrypt communications between computing devices, user interface modules to generate interfaces for receiving input from users, and so forth.

Other data 426 within the data store(s) 420 may include configurations, settings, preferences, and default values associated with computing devices. Other data 426 may also include encryption keys and schema, access credentials, and so forth.

In different implementations, different types of computing devices may have different capabilities or capacities. For example, servers used as fulfillment devices 108 may have greater processing capabilities or data storage capacity than portable computing devices used as user devices 132.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
  determine a user accessing a seller website, wherein the seller website offers a first item for sale by a seller;
  provide, using one or more fulfillment devices, first data to the seller website to cause a control to be presented within the seller website, wherein the control indicates a shipping benefit of an online store, wherein the online store is associated with the one or more fulfillment devices that maintain one or more fulfillment locations;
  determine, based on the user accessing the seller website, a first location of the user;

determine a fulfillment location of the one or more fulfillment locations associated with storage of the first item;

determine a first delivery time for transporting the first item from the fulfillment location to the first location, based on the first location and the fulfillment location;

cause presentation of control within the seller website, wherein the control presents the first delivery time and a prompt for first user input, wherein the first user input is associated with login to a user account associated with the online store;

authenticate the user account at the online store based on the first user input acquired via the control on the seller website;

determine, based on the authenticated user account, an updated user location and a second delivery time for transporting the first item from the fulfillment location to the updated user location;

cause an update to the control presented on the seller website, wherein the update to the control replaces the first delivery time with the second delivery time;

receive purchase data associated with the user purchasing the first item from the seller website;

generate first order data by processing the purchase data at the one or more fulfillment devices; and based on the first order data, cause delivery of the first item, using the one or more fulfillment devices, from the fulfillment location to the updated user location by the second delivery time.

2. The system of claim 1, the one or more hardware processors to further execute the computer-executable instructions to:

determine that a quantity of the first item associated with the fulfillment location exceeds a threshold quantity, wherein the first delivery time is presented based in part on the quantity of the first item exceeding the threshold quantity.

3. The system of claim 1, the one or more hardware processors to further execute the computer-executable instructions to:

determine eligibility of the user account to receive the shipping benefit of the online store.

4. The system of claim 1, the one or more hardware processors to further execute the computer-executable instructions to:

receive second user input associated with a purchase of a second item;

provide second order data indicative of the second item to a computing device associated with the seller website; and determine payment data associated with the user account, wherein the payment data indicates one or more payment instruments to complete the purchase of the first item and the purchase of the second item, and wherein the first order data and second order data are generated in response to the payment data.

5. The system of claim 1, the one or more hardware processors to further execute the computer-executable instructions to:

determine first payment data associated with the user account, wherein the first payment data indicates one or more payment instruments to complete the purchase of the first item, and wherein the first order data is generated in response to the first payment data;

receive second user input associated with a purchase of a second item; and provide second order data indicative of the second item to a computing device associated with the seller website.

6. The system of claim 1, the one or more hardware processors to further execute the computer-executable instructions to:

determine a network address associated with a user device of the user accessing the seller website, wherein the first location is determined based in part on the network address.

7. The system of claim 1, the one or more hardware processors to further execute the computer-executable instructions to:

receive second data indicating that the first item is available for shipping using the shipping benefit of the online store; and receive an indication that at least a threshold quantity of the first item is available at the fulfillment location;

wherein the second data is provided to the seller website to cause the control to be presented on the seller website, responsive to the indication that the threshold quantity of the first item is available at the fulfillment location.

8. The system of claim 7, the one or more hardware processors to further execute the computer-executable instructions to:

receive an indication of one or more characteristics of the first item, wherein the fulfillment location of the first item is determined based on the indication of the one or more characteristics of the first item.

9. The system of claim 1, the one or more hardware processors to further execute the computer-executable instructions to:

determine second user input associated with a purchase of a second item;

generate second order data indicative of the second item and the updated user location;

receive third user input indicative of one or more characteristics for shipment of the second item; and include an indication of the one or more characteristics for shipment of the second item in the second order data.

10. A system comprising:

one or more memories storing computer-executable instructions; and one or more hardware processors to execute the computer-executable instructions to:

receive first data indicating that a first item, offered for sale via a seller website, is available for shipping using a shipping benefit of an online store, wherein the online store is associated with one or more fulfillment devices that maintain one or more fulfillment locations;

receive an indication that at least a threshold quantity of the first item is available at a designated fulfillment location of the one or more fulfillment locations;

responsive to the indication that the threshold quantity of the first item is available at the designated fulfillment location, provide, using the one or more fulfillment devices, second data to the seller website to cause a control to be presented on the seller website, wherein the control indicates the shipping benefit of the online store;

determine, based on a user accessing the seller website, an initial user location;

determine, based on the initial user location, a first delivery time for transporting the first item from the designated fulfillment location to the initial user location;

cause the control to be presented on the seller website, wherein the control includes the first delivery time and a prompt for first user input, wherein the first user input is associated with login to a user account associated with the online store;

authenticate the user account at the online store based on the first user input acquired via the control on the seller website;

determine, based on the authenticated user account, an updated user location and a second delivery time for transporting the first item from the designated fulfillment location to the updated user location;

cause an update to the control presented on the seller website, wherein the update to the control replaces the first delivery time with the second delivery time;

receive purchase data associated with the user purchasing the first item from the seller website;

process the purchase data, at the one or more fulfillment devices, to generate first order data; and based on the first order data, cause delivery of the first item, using the one or more fulfillment devices, from the designated fulfillment location to the updated user location by the second delivery time.

11. The system of claim 10, the one or more hardware processors to further execute the computer-executable instructions to:

determine a network address associated with a user device of the user accessing the seller website; and determine the initial user location based at least in part on the network address.

12. The system of claim 10, the one or more hardware processors to further execute the computer-executable instructions to:

receive second user input associated with a purchase of a second item associated with the seller website;

generate second order data indicative of the second item; and provide the second order data to a computing device associated with the seller website to cause transport of the second item to the updated user location.

13. The system of claim 10, the one or more hardware processors to further execute the computer-executable instructions to:

determine an eligibility of the user account to receive the first item within the second delivery time.

14. A method comprising:

receiving first data indicating that a first item, offered for sale via a seller website, is available for shipping using a shipping benefit of an online store, wherein the online store is associated with one or more fulfillment devices that maintain one or more fulfillment locations;

receiving an indication that at least a threshold quantity of the first item is available at a designated fulfillment location of the one or more fulfillment locations;

responsive to the indication that the threshold quantity of the first item is available at the designated fulfillment location, providing, using the one or more fulfillment devices, second data to the seller website to cause a control to be presented on the seller website, wherein the control indicates the shipping benefit of the online store;

determining, based on a user accessing the seller website, an initial user location;

determining, based on the initial user location, a first delivery time for transporting the first item from the designated fulfillment location to the initial user location;

causing the control to be presented on the seller website, wherein the control includes the first delivery time and a prompt for first user input, wherein the first user input is associated with login to a user account associated with the online store;

authenticating the user account at the online store based on the first user input acquired via the control on the seller website;

determining, based on the authenticated user account, an updated user location and a second delivery time for transporting the first item from the designated fulfillment location to the updated user location;

causing an update to the control presented on the seller website, wherein the update to the control replaces the first delivery time with the second delivery time;

receiving purchase data associated with the user purchasing the first item from the seller website;

processing, at the one or more fulfillment devices, the purchase data, based on the user account, to generate first order data; and based on the first order data, causing delivery of the first item, using the one or more fulfillment devices, from the designated fulfillment location to the updated user location by the second delivery time.

15. The method of claim 14, further comprising:

determining second user input associated with a purchase of a second item;

generating second order data indicative of the second item and the updated user location; and providing the second order data to a computing device associated with the seller website.

16. The method of claim 15, further comprising:

receiving third user input indicative of one or more characteristics for shipment of the second item; and including an indication of the one or more characteristics for shipment of the second item in the second order data.

17. The method of claim 14, further comprising:

receiving an indication of one or more characteristics of the first item, wherein the designated fulfillment location of the first item is determined based on the one or more characteristics of the first item.

18. The method of claim 14, further comprising:

determining a network address associated with a user device of the user accessing the seller website, wherein the first delivery time is further determined based on the initial user location associated with the network address.

19. The method of claim 14, wherein the updated user location is determined based on the user account.

20. The method of claim 19, further comprising:

determining eligibility of the user account to receive the first item within the second delivery time.

* * * * *

UNITED STATES PATENT AND TRADEMARK OFFICE
CERTIFICATE OF CORRECTION

| | | |
|---|---|---|
| PATENT NO. | : 12,314,890 B2 | Page 1 of 1 |
| APPLICATION NO. | : 17/457527 | |
| DATED | : May 27, 2025 | |
| INVENTOR(S) | : Ryan John Lohan et al. | |

It is certified that error appears in the above-identified patent and that said Letters Patent is hereby corrected as shown below:

In the Claims

Column 19, Claim 1, Line 8:
Currently reads: "cause presentation of control within the seller website"
When it should read: -- cause presentation of the control within the seller website --

Signed and Sealed this
Eighth Day of July, 2025

Coke Morgan Stewart
*Acting Director of the United States Patent and Trademark Office*